United States Patent [19]

Rice et al.

[11] Patent Number: 4,898,673

[45] Date of Patent: Feb. 6, 1990

[54] DYNAMIC SUPERCRITICAL FLUID EXTRACTION SYSTEM

[75] Inventors: Wayne K. Rice, Wanatah, Ind.; Laxman Singh, South Holland, Ill.

[73] Assignee: Vitamins, Inc., Chicago, Ill.

[21] Appl. No.: 61,787

[22] Filed: Jul. 11, 1987

[51] Int. Cl.⁴ .............................................. B01D 11/00
[52] U.S. Cl. .................................. 210/634; 210/787; 210/195.1; 260/412.4; 422/261; 422/281
[58] Field of Search ............ 210/634, 787, 195.1, 210/511; 422/281, 261; 426/425, 489; 260/412.4, 412.2

[56] References Cited

U.S. PATENT DOCUMENTS

| | | | |
|---|---|---|---|
| 1,535,769 | 4/1925 | Gallardo | 99/287 |
| 3,005,398 | 10/1961 | Sandler | 99/289 |
| 4,018,899 | 4/1977 | Seckler et al. | 426/55 |
| 4,153,063 | 5/1979 | Roselius | 131/143 |
| 4,443,321 | 4/1984 | Compton | 208/8 |

FOREIGN PATENT DOCUMENTS

| | | |
|---|---|---|
| 1164298 | 2/1964 | Fed. Rep. of Germany . |
| 3118272 | 12/1982 | Fed. Rep. of Germany . |
| 1206381 | 2/1960 | France . |
| 1358790 | 3/1964 | France . |

*Primary Examiner*—Bernard Nozick
*Attorney, Agent, or Firm*—Donald E. Egan

[57] ABSTRACT

Soluble materials are continuously extracted from solids using extracting solvents such as carbon dioxide by circulating a mixture of the solids in carbon dioxide at elevated pressure through a closed loop pipeline. A mixture of extracts dissolved in carbon dioxide is continuously removed from the system and material to be extracted is continually added. Multiple extraction stages are also disclosed.

15 Claims, 2 Drawing Sheets

DYNAMIC SUPERCRITICAL FLUID EXTRACTION SYSTEM

FIELD OF INVENTION

The present invention relates to a continuous process of extraction of soluble materials from solids using extracting solvents under elevated pressure, while circulating solvent-solids mixtures through a closed loop pipeline. The extracting solvents may be liquids or supercritical fluids. Material to be extracted is continuously added to the system. Extracts and the extracted material are continuously removed. Fractionation of products also may be carried out through proper control of extraction pressures and temperatures. Invention also relates to an apparatus in which such extractions are carried out.

BACKGROUND OF INVENTION

There are many references in prior art suggesting extraction with liquid and supercritical fluids, wherein solids are placed in static environment. Fluids are pumped through a static mass of solids to dissolve the extractables.

The prior art describing such procedures includes U.S. Pat. Nos. 4,156,688; 4,328,255; 4,466,923; 4,493,854; and 4,495,207.

A related procedure for extraction is described in application Ser. No. 732,362 filed May 8, 1985 now U.S. Pat. No. 4,683,063.

BRIEF DESCRIPTION OF THE PRESENT INVENTION

The present invention is based on the discovery that extraction in a dynamic setting, where the material to be extracted is continuously charged at elevated pressure into flowing solvent, provides many advantages over the prior art static systems. The present invention provides a dynamic system with continuous mixing and movement of material to be extracted and the extracting solvents. Advantages of the system are:

1. Apparatus can be put together with easily manufactured components, i.e., pipes of suitable diameter. Cost is much less than typical high pressure system.
2. Solids to be extracted and solvents are continuously agitated, thus effecting efficient extractions.
3. Pressures can be easily increased or decreased, thus facilitating stepwise extraction/fractionation.
4. System is much safer than high pressure extractor of larger diameter due to narrow cylinder pipeline configuration.

Broadly, the present invention contemplates carrying out a dynamic extraction by charging the extracting solvent to the system under pressure, wherein the solvent is agitated or circulated. The material to be extracted is then injected under pressure into said flowing solvent to form a mixture with said solvent. The pressure on said mixture may be increased by pumping. Portions of said mixture are removed from the system and the extract portion of said mixture is recovered from the unextracted portion of the mixture.

One embodiment of the present invention contemplates a multiple pressure stage extraction which may or may not use closed loops. The extract recovery may take place at one or more of the pressure stages.

In the multi-stage dynamic extraction, portions of the mixture may be separated on more than one stage, in which case the process may be used to fractionate the extractable portions of the material to be extracted. Alternatively, the multi-stage dynamic extraction process may be used as a mechanism to establish a pumpable mixture of solvent and material to be extracted at high ratios of solids to gas, at selected elevated pressure, and selected temperature to achieve desired solubility conditions in the final stage.

In another embodiment, the extraction apparatus of the present invention comprises a closed loop of pipe provided with a circulating pump, a means to inject an extracting solvent (such as a supercritical fluid) in sufficient quantity to essentially fill the closed loop pipe, a means to inject the material to be extracted, and means to remove some or all of the circulating mixture from the closed loop. The materials removed from the closed loop are conveyed to a recovery means where solids are separated from the liquids and solids may be recovered. The recovery means also functions to separate liquids, i.e., separate the liquid extract from the extracting solvent. The separated solvent is recovered and returned to the closed loop circulating system. This embodiment contemplates the use of one or more staged closed loops.

In the closed loop embodiment, the extraction process is carried out by charging the extraction solvent into the closed loop pipe fitted with a pump adapted to circulate fluids around the loop. Extraction solvent (liquid or supercritical fluid) is charged to the pipeline and circulated in the closed loop. The charging is continued until the desired pressure is attained. Predetermined temperature of the extraction solvent is attained and maintained in the loop. Solids to be extracted are placed in the solids charging means of the system. Some or all of the circulating solvent is diverted through the charging means, whereby solids are injected into the circulating fluid pipeline. After a suitable period of time, a portion of the circulating mixture is diverted from the closed loop to the recovery means.

The principal function of the recovery means is to allow the removal of extract from the dynamic extraction system without the need to stop circulation of the material to be extracted in the extracting solvent through the closed loop. This feature allows recovery of extract which is soluble in the extraction solvent under the particular conditions which exist in the closed loop (i.e., under the particular conditions of temperature and pressure). After the desired recovery has been made, the extraction conditions (i.e., the temperature and pressure in the closed loop) may be varied to change the solubility conditions and thus dissolve another extract which can be thereafter recovered.

In another embodiment of the closed loop system, solids are first separated from liquids in the recovery means, which allows recovery of the extracted solids. The liquids are then separated from the circulating mixture, under pressure. Unrecovered solids or liquids may be returned to the closed loop or are carried forward under pressure to another loop.

If needed, pressure is increased after first extraction. Solids are circulated again in fluid to extract another component at different conditions. Fractionation is thus achieved.

DESCRIPTION OF DRAWINGS

Referring to FIG. 1, closed loop 20 includes circulating pump 22, external check valve 24 and pressure gauge 26. Desirably, a temperature sensing device 28 is also employed. The pump 22 preferably is a positive displacement piston pump, but other types of pumps may be used.

Figure 1:
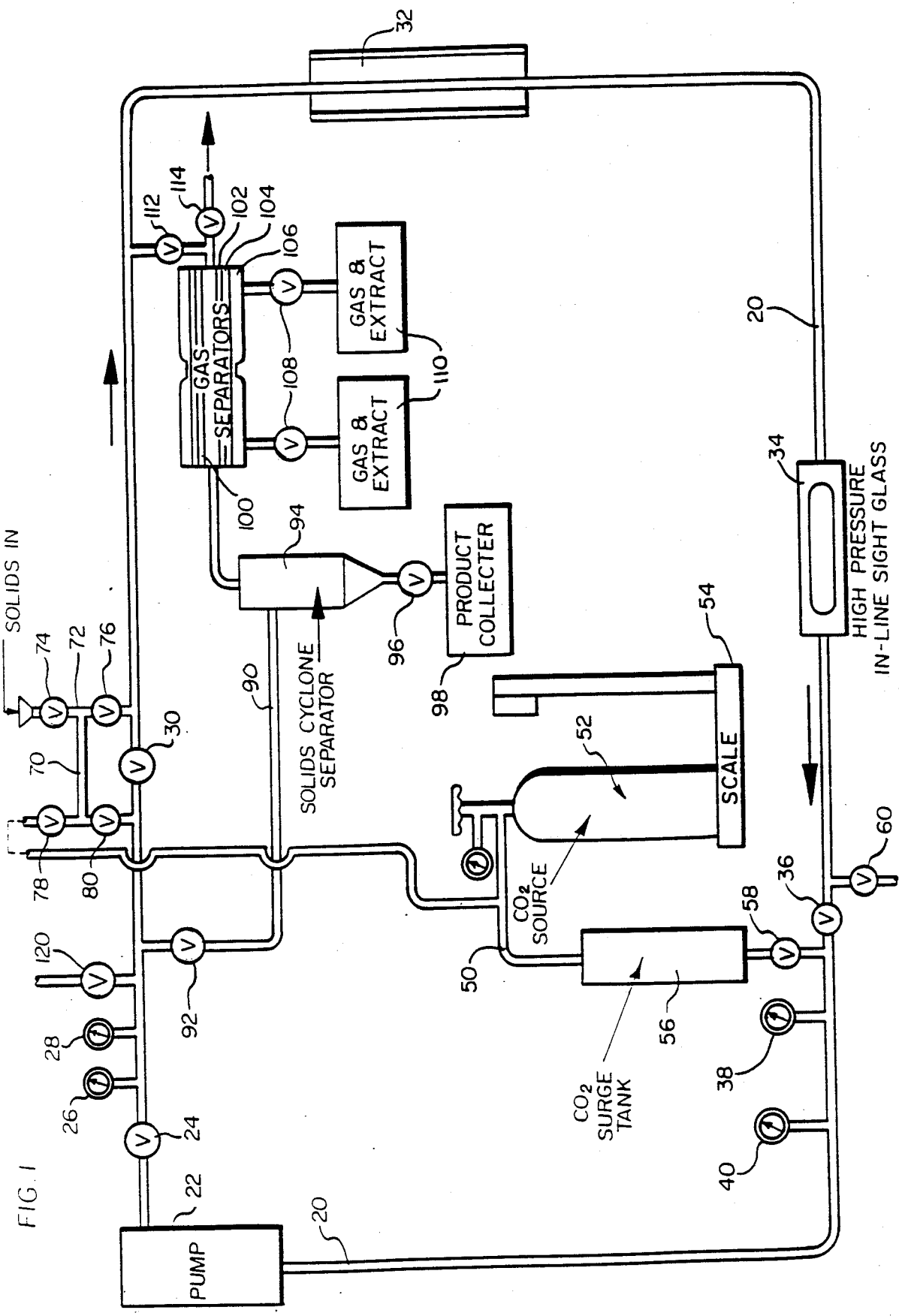
FIG. 1 of the drawing is a schematic illustration of the closed loop extraction apparatus of the present invention.

Valve 30 controls the flow of materials through the closed loop, and is associated with the solids charging means 72, and recovery means 90 further described below. Temperature regulator 32 may be a heat exchanger or other temperature regulating device, located along the closed loop 20 in order to regulate the temperature of the materials flowing through the closed loop.

Preferably, an in-line sight glass 34 is included in the closed loop 20 in order to provide visual observation of the materials moving through the closed loop. Valve 36, located in closed loop 20, is associated with the extracting solvent charging system. Preferably, temperature sensor 38 and pressure gauge 40 on closed loop 20 are downstream from the extracting solvent charging valve 36.

The extracting solvent charging means is shown generally at 50. Generally, it comprises a $CO_2$ source 52 which may be a charged cylinder. Preferably, the $CO_2$ source is on a scale in order to determine the weight of $CO_2$ charged to the closed loop 20. The $CO_2$ is fed from source 52 through liquid $CO_2$ surge vessel 56 in order to provide for a smooth flow from the source 52 to the closed loop 20. Valve 58 is used to regulate the flow of the $CO_2$ from the extracting solvent charging means 50 to the closed loop 20. Vent valve 60 allows the venting of air as the air is replaced by extracting fluid.

The solids charging means is shown generally at 70. Charging means 70 comprises charging chamber 72, which is defined by upper valve 74 and lower valve 76. An extracting solvent inlet is connected to chamber 72 near upper valve 74. Solvent may be directed to the charging chamber 70 by opening solvent valve 78, connected to extracting solvent charging means 50 (i.e., $CO_2$ source 52). Alternatively, solvent from the closed loop may be directed to the chamber 72 by opening valve 80. In order to operate the solids charging device, valve 74 is opened, while valves 76, 78 and 80 are closed. The desired quantity of solids are fed into chamber 72 and valve 74 is closed. Either valve 78 or 80 is opened, which brings fluid pressure, i.e., extracting solvent pressure, on the charged solids in charging chamber 72. Valve 30 is preferably closed while valve 76 is opened to permit the solids from chamber 72 to be fed into the closed loop.

Alternatively, solids may be continuously injected into a flowing solvent under pressure using a screw-type extruder, which might have $CO_2$ or other extracting fluid concurrently metered thereto at a predetermined rate.

The product recovery means 90 is connected to closed loop 20 through valve 92. Valve 30 may be closed in order to increase the flow from closed loop 20 to recovery means 90. Opening valve 92 permits the extracting solvent/solids mixture to flow into solids separator cyclone 94, which separates the solids from the liquid of the mixture. Valve 96 allows intermittent removal of the solids from the cyclone into a product collector 98. The liquids passing out of cyclone 94 pass into liquid separator 100.

Liquid separator 100 comprises an annular porous sleeve 102, which is in contact with the liquid mixture flowing through separator 110. Porous sleeve 102, which is surrounded by steel mesh cage 104 for support, may be fabricated from sintered metal, expanded metal or other types of membranes. Pressure housing 106 surrounds the porous sleeve 102/steel mesh cage 104 composite and maintains the pressure within the liquid separator in order to limit the pressure differential between the liquids passing through into the liquid separator and the pressure jacked on the outside. The liquid separator 100 may be of the type described in application Ser. No. 732,362 filed May 8, 1985 now U.S. Pat. No. 4,683,063—see FIG. 4. The function of the liquid separator 100 is to allow the mixture of solids and liquids to flow through the liquid separator 100, while permitting controlled quantity of the liquids (both the solvent and the extract) to be separated from the mixture containing solids and the remaining liquids. Valve 108 is opened intermittently to allow the liquids from liquid separator 100 to proceed to solvent separator 100, wherein the extracting solvent is separated from the liquid extract.

The materials passing through the liquid separator 100 may be directed back to the closed loop through valve 112 or may be exhausted through valve 114.

Valve 120 is an optional take-off valve which allows controlled quantities of the circulating materials to be directed from closed loop 20 into another high pressure extraction or recovery stage. The other high pressure extraction stage may be a closed loop of the type defined herein, but run at a higher pressure. Alternatively, the take-off product may be charged into a variable volume cylinder of the type described and claimed in patent application Ser. No. 774,332 filed Sept. 10, 1985.

The apparatus described above and shown in FIG. 1 may be operated as follows:

Step 1: Charging Extracting Solvent Into Closed Loop

The closed loop 20 is charged with $CO_2$ liquid from source 52 to a pressure of 500 psi, keeping the temperature below 75° F. with dry ice in temperature regulating device 32. With $CO_2$ source 52 turned on and all system valves closed, open valve 30 and valve 58, permitting the liquid $CO_2$ to fill the circulating system. Vent valve 60 is opened to allow air to be purged from the system. Double acting positive displacement piston pump 22 is activated. Charging is continued until liquid is seen in the sight gauge 34. When the appropriate amount of $CO_2$ has been charged (as determined from a flow meter or as based on scale 54) valve 58 is closed.

Step 2: Charging of Solids Into Circulating Pressure Loop

Upper chamber valve 74 is opened and the desired quantity of solids to be extracted are charged into chamber 72. Valves 30 and 74 are closed and valves 76 and 80 are opened. This establishes a fluid pressure on the solids charging chamber 72 and circulates extracting solvent through the solids in charging chamber 72 and injects the solids into the closed loop 20. A slight pressure surge is noted as the solids are injected. The respective valves are closed and opened to re-establish full operating circulation in the closed loop.

Step 3: Establishing Extraction Pressure

The pressure under which the extraction process will be accomplished is established, in order to control the solubility of the material to be extracted. The pressure can be increased from the charging pressure up to any desired higher pressure simply by adding additional solvent to the closed loop 20 through the solvent charging means 50. The temperature may be adjusted by applying heating or cooling through temperature regulator 32 to the closed loop 20. For example, by adjusting the temperature to higher than the supercritical temperature threshhold, the system may be operated under supercritical conditions using supercritical fluid as the extracting solvent. Alternately, the temperature may be lowered (held below 89° F. for $CO_2$) and the system will function as a high pressure liquid extraction system.

Step 4: Recovery of Products

To discharge from the closed loop system while in the full circulating mode, valve 30 is at least partially closed and the circulating materials are fed through recovery means 90. Complete closing of valve 30 forces full circulation of all materials through the recovery means 90.

Circulating materials from the closed loop are first directed through solids separating cyclone 94, wherein a large proportion of the solids are separated from the circulating materials. The solids collect near the bottom of the cyclone and are discharged from cyclone 94 by intermittently opening valve 96 where the solids are discharged to a meal collector, which may be a bag-type filter.

The liquids and the remaining solids are then directed to liquid separator 100. The pressure in pressure housing 106 is controlled to produce a relatively small pressure drop from the interior of the liquid separator 100 to the pressure housing. The structure of the liquid separator 100 permits liquids to separate from the solids passing through the liquid separator.

The extracting solvent is separated from the extract by reducing the pressure thereon. At reduced pressure, the solubility of the extract may be diminished sufficiently to precipitate the extract from the solvent. In other cases, it may be necessary to vaporize the solvent to recover the liquid. In either event, the used solvent can be returned to the system. As is shown in FIG. 1, the liquid/solids mixture emerging from liquid separator 100 is directed back to closed loop 20, although it may be directed to a recovery stage.

Valves 78 and 80 may be opened to provide additional carbon dioxide to the circulating materials to assist in the recovery of solids, if needed.

Figure 2:
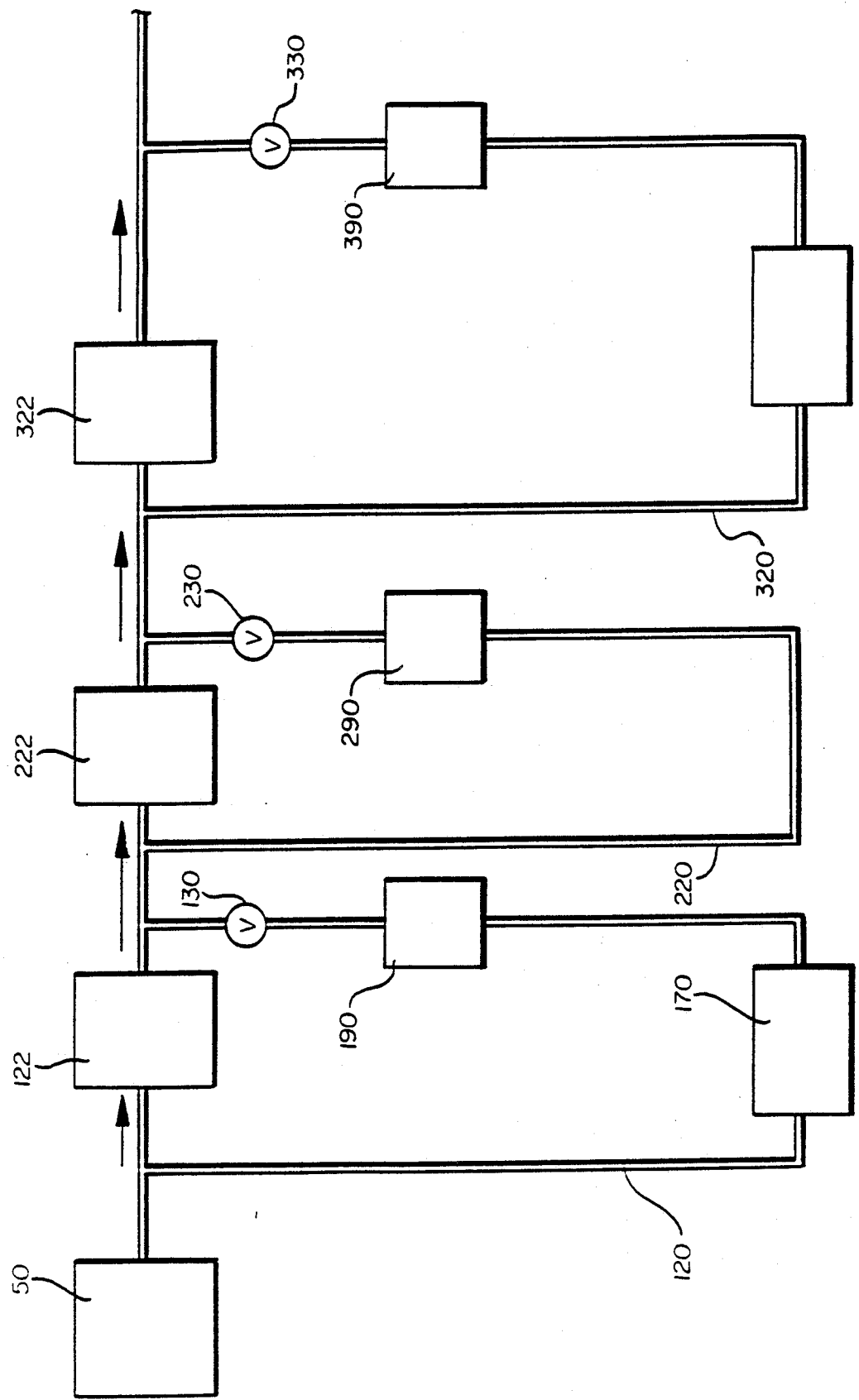
FIG. 2 of the drawing is a schematic illustration of a multi-stage dynamic extraction system showing three different pressure stages.

FIG. 2 illustrates a multi-stage dynamic extraction system having three separate pressure stages.

The first stage is the low pressure stage (e.g., up to 1,100 psi for $CO_2$), which comprises closed loop 120, which includes pressure pump 122 adapted to circulate fluids through closed loop 120. Extracting solvent charging means 50 is also connected to the first stage. Solids charging means 170 is also connected to the first stage and may be located within said first closed loop 120 as illustrated. In the first stage, the basic charging system 50 pressure, e.g., 500 psi, would be used in the first stage of a multi-stage system. A separate $CO_2$ source and/or pressure pump may used to intermittently inject solids into the first stage through charging means 170 into the flowing solvent of the first stage where the resulting mixture would be circulated. In this case, the recovery means 90 could be operated to recover only a portion of the extract liquid using a liquid separator of the type shown in FIG. 1, which may be used to remove extracting solvent and the extract soluble under the conditions of the first loop. Optionally, recovery means 190, similar to that shown in FIG. 1, may be included in the low pressure loop.

In this embodiment, shut-off valve 130 of the low pressure closed loop shown in FIG. 2 may be intermittently closed to cause the circulating mixture to proceed to the second stage of the extraction system. Cut-off valve 130 allows the closed loop 120 to be closed, causing pump 120 to move the mixture in the first stage directly to the second stage without going through the closed loop 120. In this embodiment, the closed loop 120 may be eliminated from some or all of the stages. Alternatively, an additional pump may be used between the stages to increase the pressure on the mixture flowing from one stage to the next.

The second, medium pressure stage (e.g., up to 10,000 psi for $CO_2$), comprises closed loop 220, to which circulating pump 222 is attached. Valve 230 allows cut-off of the closed loop 220 so that mixture being pumped by circulating pump 222 may be fed directly into the high pressure loop. Optionally, recovery means 290, similar to that shown in FIG. 1, may be included in the loop.

The third, high pressure stage (e.g., above 10,000 psi for $CO_2$), includes closed loop 320, circulating pump 322 and recovery means 390. The recovery means 390 may be of the type shown in FIG. 1. Alternatively, recovery means may comprise a variable volume cylinder of the type described and claimed in U.S. patent application Ser. No. 774,332 filed Sept. 10, 1985. The present invention contemplates that the output from a high pressure loop could be fed to a bank of such several variable volume cylinders. In this embodiment, solids would be discharged from the dynamic extraction apparatus as "fluid free" materials and liquids (or gas) to lower pressures for extraction separation. Lower pressure fluids, stripped of the extract, could be then sent back to stage 1 for recycling.

The multi-stage system may use 2 or more stages. The multi-stage system has the advantage of being charged with a free-flowing mixture of solids suspended in extracting fluid, which can be continuously circulated at a higher pressure, using a relatively high ratio of solids to gas.

The apparatus of the present invention may be oriented horizontally or vertically or any combination thereof. While horizontal orientation is preferred in that the piping can be buried for safety reasons, there is no restriction on the orientation of the system.

EXTRACTING SOLVENTS

In carrying out the present invention, a wide variety of extracting fluids may be used as the solvent. Although most of the Examples herein illustrate the use of carbon dioxide to extract lipid oils from vegetable seeds, the present invention is not so limited. Generally, it is preferred to use as an extracting fluid a material which is normally gaseous, such as carbon dioxide, but other materials may be used. Other useful gases include nitrous oxide, freons, low molecular weight hydrocarbons, such as ethane or propane. Liquid solvents, such as propanol, may also be used, either alone or in combination with gaseous solvent, such as carbon dioxide. Liquid solvents contemplated by the present invention include hexane, isopropanol, propylene glycol and the like.

EXTRACTING PRESSURE

The present invention may be operated under a wide variety of pressures. Low pressures such as 100 psi or lower may be used if such pressures, when combined with the adjustment of the extracting temperature, produce the desired solubility conditions to the extract sought to be recovered. The extracting pressures may be as high as 12,000 psi or more, again depending upon the nature of the product being extracted. Basically, the apparatus of the present invention may be used to adjust the pressure and temperature combinations to achieve the desired solubility of the material which is to be extracted.

EXTRACTING TEMPERATURE

A wide variety of extracting temperatures may be employed. Because of the relatively long nature of the closed loop described herein, temperature control is relatively simple. Temperatures from below 0° F. to 200° F. or more have been used successfully.

DWELL TIME

The dwell time of the extracting pressure is not critical, because the circulating motion of the system creates agitation of the solid materials within the solvent fluids, whereby a fast, efficient extraction is accomplished. If desired, the closed loop may be fitted with internal baffels to increase the agitation of the mixture as it circulates through the closed loop.

MATERIALS TO BE EXTRACTED

The present invention may be used to extract soluble materials from any solids containing such solubles. It is only necessary to subdivide the solids sufficiently to form a pumpable slurry when mixed with the extraction solvent. Mixtures of 1 part by weight of solids (soybean flakes) for each 10 parts by weight of solvent ($CO_2$) have been successfully extracted. Higher or lower ratios are contemplated, depending upon the nature of the solid and the nature of the solvent.

Liquid materials may also be extracted by absorbing the liquid to be extracted on a solid carrier. For example, wheat germ oil may be absorbed in diatomaceous earth to form a free flowing matrix which may be used for extraction. Liquids may also be extracted without using solid carriers.

The following Examples serve to illustrate the use of the dynamic extraction process of the present invention with respect to carbon dioxide extraction of certain vegetable substances. However, it is understood these Examples are set forth merely for illustrative purposes and many other solvents and substances may be extracted within the scope of the present invention.

EXAMPLE 1

A closed loop system consisting of 230 feet of ½ inch schedule 80 pipe, a circulating pump, a sight gauge, and a solid/liquid separator (as shown in FIG. 1) was flushed in $CO_2$. Liquid $CO_2$ was charged in the closed loop from a $CO_2$ bottle until 500 psi pressure was achieved. Circulating pump was turned on and liquid $CO_2$ was visible in glass sight glass. Approximately 17 pounds of $CO_2$ at approximately 32° F. was needed to fill the system.

100 g of non-dehulled soybean flakes were charged in stages in an 18 inch charging chamber of ½ inch pipe at atmospheric pressure. The top valve was closed and circulating $CO_2$ was diverted through the soyflakes in the charging chamber. Pumping pressure quickly injected the flakes into circulating $CO_2$ in the closed loop. Flakes were circulated in the $CO_2$ in the closed loop for 2 minutes. Extracted solids were collected in the cyclone separation chamber. Extracted solid flakes were separated from the solvent extract liquid mixture through 10 inch porous metal tube concentrically placed inside the separator.

Analysis of extracted flakes showed 10.0% residual fat. This represented extraction of 45% of the original fat. Efficiency can be easily increased by increasing temperature and/or pressure.

EXAMPLE 2

In an apparatus described in Example 1, 1.5 pounds of soyflakes were charged in the pipeline containing approximately 15 pounds of $CO_2$ at 600 psi pressure. Mixture of liquid $CO_2$ and soyflakes could be easily circulated in the system, thus indicating a loading of 10:1 ratio (by weight) of gas to soyflakes solids.

EXAMPLE 3

In an apparatus described in Example 1, pipeline was charged with liquid $CO_2$ at 650 psi pressure. 100 g of ground vanilla beans were injected under pressure as described in Example 1. Within 5 minutes of loading, $CO_2$ was separated from solids. Extracted vanilla beans were removed from system. High pressure liquid chromotographic analysis showed that 45% of original vanillin was extracted from the beans.

EXAMPLE 4

In an apparatus described in Example 1, system was charged with $CO_2$ at 95° F. temperature and 1,500 psi pressure. 100 g soyflakes were injected in supercritical $CO_2$ in pipeline. Pressure of the system was increased to 2,000 psi by pumping in more $CO_2$. Mixture was circulated for 5 minutes. Extracted solids were collected from solids cyclone separator. 43% of original oil was easily extracted.

The method and apparatus of the present invention may be used to carry out the following extractions and fractionations:
Fractionation of wheat germ oil
Fish oil deodorization and fractionation
Extraction of paprika
Fractionation of vitamins A, E and K
Separations of vitamin E compounds
Extraction of crude oil petroleum sludge
Extraction of oil seeds using combination of liquid solvent with $CO_2$ solvent The forms of invention herein shown and described are to be considered only as illustrative. It will be apparent to those skilled in the art that numerous modifications may be made therein without departure from the spirit of the invention or the scope of the appended claims.

We claim:
1. A method of carrying out a dynamic extraction comprising:
   charging a closed-loop first stage of a dynamic system with extracting solvent under pressure;
   pumping said solvent to cause flow in said closed-loop first stage;
   injecting material to be extracted under pressure into said flowing solvent in said closed-loop first stage to form a co-currently flowing mixture with said solvent;
   removing said mixture from said system;

separating a liquid comprising extract dissolved in solvent from said removed mixture; and separating said extract from said solvent and recovering extract.

2. A method as described in claim 1, wherein the pressure on said flowing mixture is increased in said first stage.

3. A method as described in claim 1, wherein the pressure on the mixture is increased by pumping said mixture to a second stage.

4. A method as described in claim 3, wherein the pressure on said mixture in said second stage is increased by pumping said mixture to at least one additional stage.

5. A method of carrying out a dynamic extraction comprising:

charging a closed loop with extracting solvent under pressure;

injecting material to be extracted under pressure to form a mixture with said solvent;

pumping said mixture to co-currently circulate said mixture through said closed loop;

removing a portion of said mixture from said closed loop;

separating a liquid comprising extract dissolved in solvent from said removed portion of said mixture; and recovering said extract from said solvent.

6. A method as described in claim 5, wherein the injecting step is intermittent.

7. A method as described in claim 5, wherein the removing step is intermittent.

8. A method of extraction as described in claim 5, wherein after extract has been removed from said closed loop the pressure of the system is increased to perform a second extraction.

9. A method as described in claim 8, wherein said extraction is carried out in subcritical liquid $CO_2$ and said second extraction is carried out in supercritical $CO_2$.

10. An apparatus for dynamic extraction comprising:

a closed-loop first stage adapted to cause fluids to flow;

a solvent injecting means to inject extracting solvent under pressure into said closed-loop first stage and to cause said solvent to flow;

means to inject material to be extracted, under pressure, into said flowing solvent in said closed-loop first stage to form a mixture with said solvent;

pumping means to cause the mixture of extracting solvent and material to be extracted to co-currently flow through said first stage;

recovery means to remove portion of said flowing mixture and to separate from said mixture a liquid comprising extract dissolved in said solvent; and means to separate said extract from said solvent and recover said extract.

11. An apparatus as described in claim 10, which includes pumping means adapted to increase the pressure on said flowing mixture and transfer said flowing mixture to a second stage.

12. An apparatus as described in claim 11, which includes at least one additional pumping means adapted to increase the pressure on said flowing mixture and to transfer the flowing mixture to at least one additional stage.

13. An apparatus for dynamic extraction comprising:

a closed loop pipe, a circulating pump adapted to circulate fluids through said closed loop;

means to inject extracting solvent under pressure into said closed loop;

means to inject material to be extracted, under pressure, into solvent flowing in said closed loop to form a mixture with said solvent;

pumping means to circulate the mixture of extracting solvent and material to be extracted co-currently through said closed loop;

recovery means to remove portion of said circulating mixture from said closed loop and to separate from said mixture a liquid comprising extract dissolved in said solvent; and means to separate said extract from said solvent and recover said extract.

14. An apparatus as described in claim 13, wherein said removed portion of said circulating mixture is passed through solids separation means adapted to separate solids from said mixture.

15. An apparatus as described in claim 14, wherein said solids separation means comprises a cyclone.

* * * * *